L. G. RILEY.
SIGNALING SYSTEM.
APPLICATION FILED APR. 12, 1915.
1,286,110.
Patented Nov. 26, 1918.
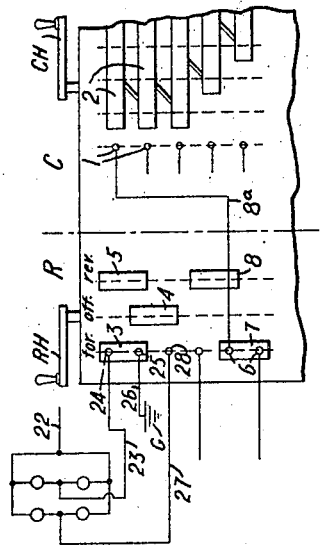
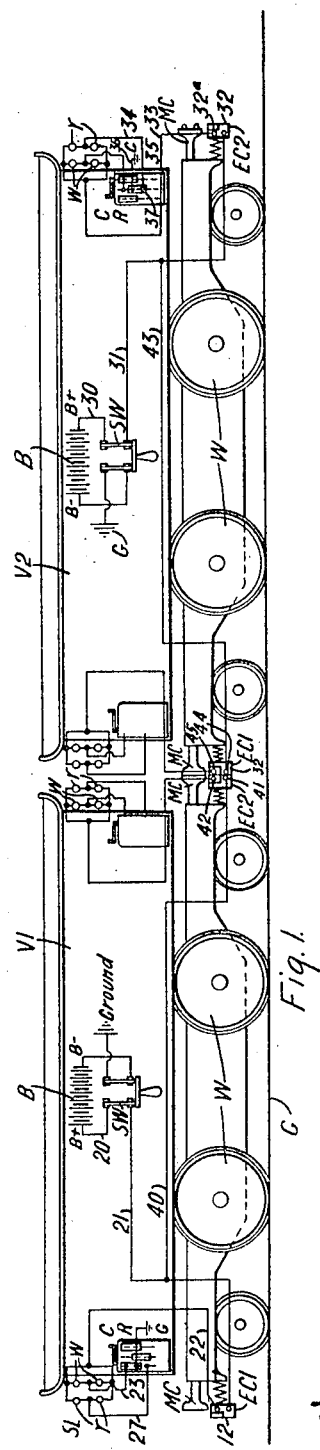
WITNESSES:
Fred A. Lind.
W. R. Coley
INVENTOR
Lynn G. Riley
BY
Wesley G. Carr
ATTORNEY

UNITED STATES PATENT OFFICE.

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SIGNALING SYSTEM.

1,286,110.

Specification of Letters Patent.   Patented Nov. 26, 1918.

Application filed April 12, 1915.   Serial No. 20,868.

*To all whom it may concern:*

Be it known that I, LYNN G. RILEY, a citizen of the United States, and a resident of Wilkinsburg, in the county of Allegheny and State of Pennsylvania, have invented a new and useful Improvement in Signaling Systems, of which the following is a specification.

My invention relates to signaling systems, and it has special reference to auxiliary signaling systems for use in connection with control systems that are employed in electric railway vehicles and the like.

The object of my invention is to provide a simple, reliable and effective system of the above-indicated character for automatically effecting desired signal indications and for employing no more than the necessary number of indications, namely one at the front end and one at the rear end of a train.

In operating a multiple-unit train of vehicles, it is customary and desirable to provide indicating means, such as white signal lamps near the front end of the train and red lamps near the rear end thereof, no indications being necessary between individual vehicles. Heretofore, it has usually been necessary to operate separate switches for manipulating the lamp circuits to give the desired indications; for example, if an additional vehicle was coupled to the train, it was necessary for a train operator to extinguish the lamps near the coupled ends, and if the train was run in the reverse direction on its return trip, the white and red lamp indications had to be changed manually by the operator, thus requiring considerable time and attention.

According to my present invention, I provide a system for automatically displaying white lamps near the front end of a train and red lamps near the rear end thereof, for automatically extinguishing the lamps near the coupled ends as an additional vehicle is coupled to the train, and for automatically reversing the white and red lamp indications when the train or vehicle is reversed in direction during its return trip. The system is thus automatically dependent upon the direction of travel of the vehicle and upon the coupling of the vehicles for effecting the desired indications.

In the accompanying drawing, Figure 1 is a diagrammatic view of a signaling system arranged in accordance with my invention and installed upon a plurality of railway vehicles; Fig. 2 is an enlarged diagrammatic representation of a portion of the control apparatus that is employed in the system illustrated in Fig. 1; and Fig. 3 is an enlarged diagrammatic view of another piece of control apparatus that is employed in my system.

Referring to Fig. 1 of the drawing, the apparatus here shown comprises a train of vehicles $V^1$ and $V^2$ of any familiar type that are provided with a plurality of suitable wheels W for running along a set of rails G, which are adapted to form the return conductor of the propulsion circuit of the vehicles, provided the vehicles are electrically driven. The vehicles may be mechanically coupled together by means of suitable coöperating couplers MC that are located at the respective ends of each vehicle, in accordance with customary practice, and are provided with a plurality of corresponding electrical coupling means $EC^1$ and $EC^2$ that are likewise adapted to engage between the individual vehicles for the purpose of manipulating certain electrical circuits, as hereinafter set forth.

The signaling system on each vehicle is shown as comprising a suitable source of energy, such as a battery B; a plurality of switching devices located near the respective ends of the vehicle and each embodying an associated controller C and reverser R of well-known types; the electrical coupling means $EC^1$ and $EC^2$; and a plurality of sets of dissimilar indicating means, such as signal lamps SL, the sets being red and white in color, for example, (designated by the letters *r* and *w*, respectively) in accordance with familiar practice, and being advantageously located near the respective ends of each vehicle.

Referring now to Fig. 2, which illustrates the controller C and reverser R in detail, the apparatus may be of any suitable type, such as is employed for controlling the circuits of electric vehicle motors. The controller C preferably comprises a control drum which is here shown developed into a single plane for purposes of convenience in illustration, and which is provided with a plurality of control fingers 1 and contact segments 2, in accordance with the particular control system that it is desired to operate. The control drum is preferably provided with a suitable control handle CH. The reverser R is provided with a plurality of signal-circuit contact segments 3, 4 and 5 that respectively correspond to a forward, an off, and a reverse position of the reverser, as hereinafter set forth. The reverser R may also comprise a plurality of control fingers 6, and the customary reversing contact segments 7 and 8 that respectively correspond to forward and reverse operation of the vehicle, the reverser being also adapted to assume the customary intermediate off position, in accordance with the position of a suitable reverser handle RH. One of the control fingers 1 may be connected to one of the control fingers 6 through a conductor $8^a$ to suitably associate the electrical circuits that are adapted to be governed by the controller and the reverser, in acordance with familiar practice, as will be understood.

Inasmuch as my signaling system is thus readily adapted for use with various types of vehicle motor control systems or may be used in vehicles that are not electrically propelled, I have not deemed it necessary to illustrate any further an electrical control system with which my signaling system will ordinarily be associated.

Referring now to Fig. 3, the electrical coupling means $EC^1$ may comprise a suitable insulated block or base member 9, a plurality of control fingers 10 and 11 and a coöperating contact segment 12 that is mounted on the member 9, and a suitable biasing member, such as a spring 13, for normally biasing the coupling means $EC^1$ away from the bumper or suitable end portion 14 of the vehicle. The arrangement of parts is such that, when the electric coupling means $EC^1$ and $EC^2$ is located at either end of a train of vehicles, the control finger 10 engages the contact segment 12 to complete an electrical circuit to the signaling lamps, as hereinafter set forth; whereas, when the coupling means $EC^1$ and $EC^2$ meet between each pair of vehicles, the springs 13 are compressed, and the base members 9 are moved relatively to the control fingers 10 to effect disengagement of the control fingers 10 and the corresponding contact segments 12.

Assuming the reverse portion R of the controller and reverser to occupy its forward running position, corresponding to the forward direction of vehicle travel, the operation of my signaling system may be set forth as follows: A circuit is established from the positive terminal B+ of the battery B through conductor 20, one blade of a suitable knife switch SW, conductor 21, contact segment 12 and control fingers 11 and 10 of the coupling means $EC^1$, conductor 22, the white lamps $w$, conductor 23, control fingers 24 and 25 (see Fig. 2) which are bridged by signal-circuit contact segment 3 in the forward position of the reverser R, and conductor 26 to the rails or other ground conductor G, to which the negative terminal B— of the battery is also connected. The white lamps $w$ are thus energized, while the circuit of the red lamps $r$ is dead-ended through conductor 27 at the control finger 28 of the reverser R in its forward running position. It will be observed that, should it become necessary to temporarily operate the train in a backward direction from the front platform, the signal indications would be the same as during forward operation, since the contact segment 5 would replace the contact segment 3 of the reverser R; although during permanent reversed train operation, the signal indications on the train ends are reversed, as set forth later.

Considering the circuits in the vehicle $V^2$, which, for the purposes of this specification, may be regarded as the rear vehicle of the train, a circuit is here established from the positive terminal of the battery B through conductors 30 and 31, coöperating contact segment 32 and control fingers $32^a$ of the electrical coupling means $EC^2$, conductor 33, the red lamps $r$, conductor 34, coöperating stationary and movable contact members 35 of the reverser R that is located near the rear end of the vehicle $V^2$ and which, therefore, occupies its off position, and conductor 36 to the ground G. In this case, the circuit of the white lamps $w$ is dead-ended at the control finger 37 of the reverser R.

Referring now to the signaling circuits that are located adjacent to the coupled ends of the vehicles $V^1$ and $V^2$, it will be observed that a conductor 40 is connected to the positive battery conductor 21, and a control finger 41 of the electric coupling means $EC^2$ that is located near the rear end of the vehicle $V^1$ is connected to the conductor 40. However, the control finger 42 of the coupling means $EC^2$ is disengaged from the contact segment 32 by reason of the spring-compressing movement of the base member 9 of the coupling means that is referred to above. In a similar manner, a conductor 43 serves to connect the positive battery conductor 31 of the vehicle $V^2$ to control finger 44 of the electric coupling means $EC^1$ that is located near the front end of the vehicle $V^2$ and that engages the corresponding coupling means $EC^2$ of the vehicle $V^1$. In this case also a control finger 45 of the coupling means $EC^1$ is disengaged from the contact segment 12 thereof so long as the two vehicles are coupled together. Consequently, neither of the sets of white and red lamps that are located near the coupled ends of the vehicles can be energized, irrespective of the positions of the controller C and reverser R.

It will be observed that the arrangement of the contact segments 12 and 32 of the electrical coupling means $EC^1$ and $EC^2$, respectively, is such that they make contact between the vehicles, whereby a train-line conductor from a single battery in one vehicle may be employed, or the positive conductors of the several vehicle batteries may be all interconnected. However, if desired, the shape of the contact segments 12 and 32 may readily be modified in accordance with the conditions encountered in various signaling systems.

From the foregoing description it will be understood that, if another vehicle is coupled to the rear end of the vehicle V², the signaling lamps near the coupled ends of the two vehicles will be automatically extinguished, while the red lamps on the rear end of the additional vehicle will remain lighted. Moreover, if the direction of travel of the train of vehicles is reversed on the return trip, so that the vehicle V² constitutes the front vehicle of the train, the white lamps on the front end of the vehicle V² are automatically illuminated as the corresponding reverser R is moved to the position that corresponds to the reversed direction of travel, and the red lamps on the rear end of the vehicle V¹ are likewise automatically rendered operative as soon as the corresponding reverser R has been moved to the customary off position.

In this way, I provide a signaling system for automatically giving desired indications on the ends of a train of vehicles and for rendering the intermediate signaling lamps inoperative as the vehicles are coupled together, and for automatically reversing the signaling indications as the return trip of the train is made.

I do not wish to be restricted to the specific control circuits or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a vehicle, of a plurality of sets of dissimilar indicating devices located near the respective ends of the vehicle, a controller and an associated reverser also located near each end of the vehicle, each reverser being adapted to assume an off position and positions respectively corresponding to forward and reverse operation of the vehicle, means for rendering one of the devices of one set operative when the corresponding reverser occupies either of its operative positions, and means for rendering the non-corresponding device in the other set operative when the other reverser occupies its off position.

2. The combination with a train of vehicles, of a plurality of sets of dissimilar indicating devices located near the respective ends of each vehicle, controllers and associated reversers similarly located in each vehicle, each reverser being adapted to assume an off position and positions respectively corresponding to forward and reverse operation of the vehicles, means for rendering one of the devices of the set on one end of the train operative when the corresponding reverser occupies either of its operative positions, means for rendering the non-corresponding device in the set on the other end of the train operative when the corresponding reverser occupies its off position, and electrical coupling means actuated in accordance with the mechanical coupling of the vehicles for rendering all other sets of indicating means inoperative.

3. The combination with a train of vehicles, of a set of dissimilar signal lamps located near the ends of each vehicle, a controller and an associated reverser similarly located in each vehicle, each reverser being adapted to assume an off position and positions respectively corresponding to forward and reverse operation of the vehicles, means operative in each vehicle singly for energizing one signal lamp through either operative position of the reverser near the front end of the vehicle and for energizing the dissimilar signal lamp through the off position of the reverser near the rear end of the vehicle, and electrical contact-making and breaking means carried by each vehicle and adapted to engage when vehicles are coupled together to effect the deënergization of the lamps near the adjacent ends of both vehicles.

In testimony whereof, I have hereunto subscribed my name this 29th day of March, 1915.

LYNN G. RILEY.

Copies of this patent may be obtained for five cents each, by addressing the "Commissioner of Patents, Washington, D. C."